United States Patent [19]

Hammarstrand

[11] Patent Number: 5,042,973
[45] Date of Patent: Aug. 27, 1991

[54] STRAW CUTTER

[76] Inventor: Per-Ake Hammarstrand, Odengatan 10, S-534 00 Vara, Sweden

[21] Appl. No.: 466,429
[22] PCT Filed: Sep. 8, 1988
[86] PCT No.: PCT/SE88/00461
  § 371 Date: Mar. 8, 1990
  § 102(e) Date: Mar. 8, 1990
[87] PCT Pub. No.: WO89/02215
  PCT Pub. Date: Mar. 23, 1989

[30] Foreign Application Priority Data
  Sep. 8, 1987 [SE] Sweden .................................. 8703481

[51] Int. Cl.⁵ ...................... A01D 34/62; A01D 41/12
[52] U.S. Cl. ...................................... 460/112; 56/294; 56/504; 56/DIG. 17
[58] Field of Search .................. 56/500, 504, 505, 156, 56/249, 251, 294, DIG. 13, DIG. 17; 460/112, 113, 73; 241/238, 241, 190

[56] References Cited

U.S. PATENT DOCUMENTS

| 2,640,309 | 6/1953 | Benson | 56/294 |
| 2,990,667 | 7/1961 | Schwalm | 56/294 |
| 3,309,854 | 3/1967 | Mitchell et al. | 56/504 |
| 4,612,941 | 9/1986 | Kunde | 460/112 |
| 4,631,910 | 12/1986 | Doyen et al. | 56/505 |

FOREIGN PATENT DOCUMENTS 2155170  5/1973  Fed. Rep. of Germany .

Primary Examiner—Terry Lee Melius
Attorney, Agent, or Firm—Ostrolenk, Faber, Gerb & Soffen

[57] ABSTRACT

A straw cutter for a combine has a rotatable rotor (11), counterknives (13) and knife arms (12) which pass between the counterknives. To increase the blowr action of the rotor and to thereby improve the distribution of disintegrated straw, the knife arms have a V- or arch-shaped cross section.

16 Claims, 5 Drawing Sheets

STRAW CUTTER

TECHNICAL FIELD

The present invention refers to a straw cutter, particularly for combines and the like, and of the type incorporating a rotor rotatably disposed in an apparatus housing and equipped with knife arms, preferably in the form of beaters, which knife arms when rotating are intended to pass between a plurality of counter-knives disposed in at least one row.

BACKGROUND OF THE INVENTION

A rotor of this type creates a blower action, whereby a portion of the conveyed air passes out through the outlet of the apparatus housing together with the disintegrated straw and contributes to the dispersion thereof. The knife arms of the rotor generally are constituted by flats having an edge at both longitudinal sides.

PURPOSE AND MOST ESSENTIAL FEATURES OF THE INVENTION

The purpose of the invention is to provide a straw cutter of the type mentioned in the introductory part, which gives an increased blower action and thereby an improved distribution of the disintegrated straw. This has according to the invention been solved therein that the knife arms of the rotor along at least a part of their length are designed with a V- or arch-shaped cross section.

BRIEF DESCRIPTION OF THE DRAWINGS

The invention hereinafter will be further described with reference to an embodiment shown in the accompanying drawings.

DESCRIPTION OF THE PREFERRED EMBODIMENT

Figure 1:
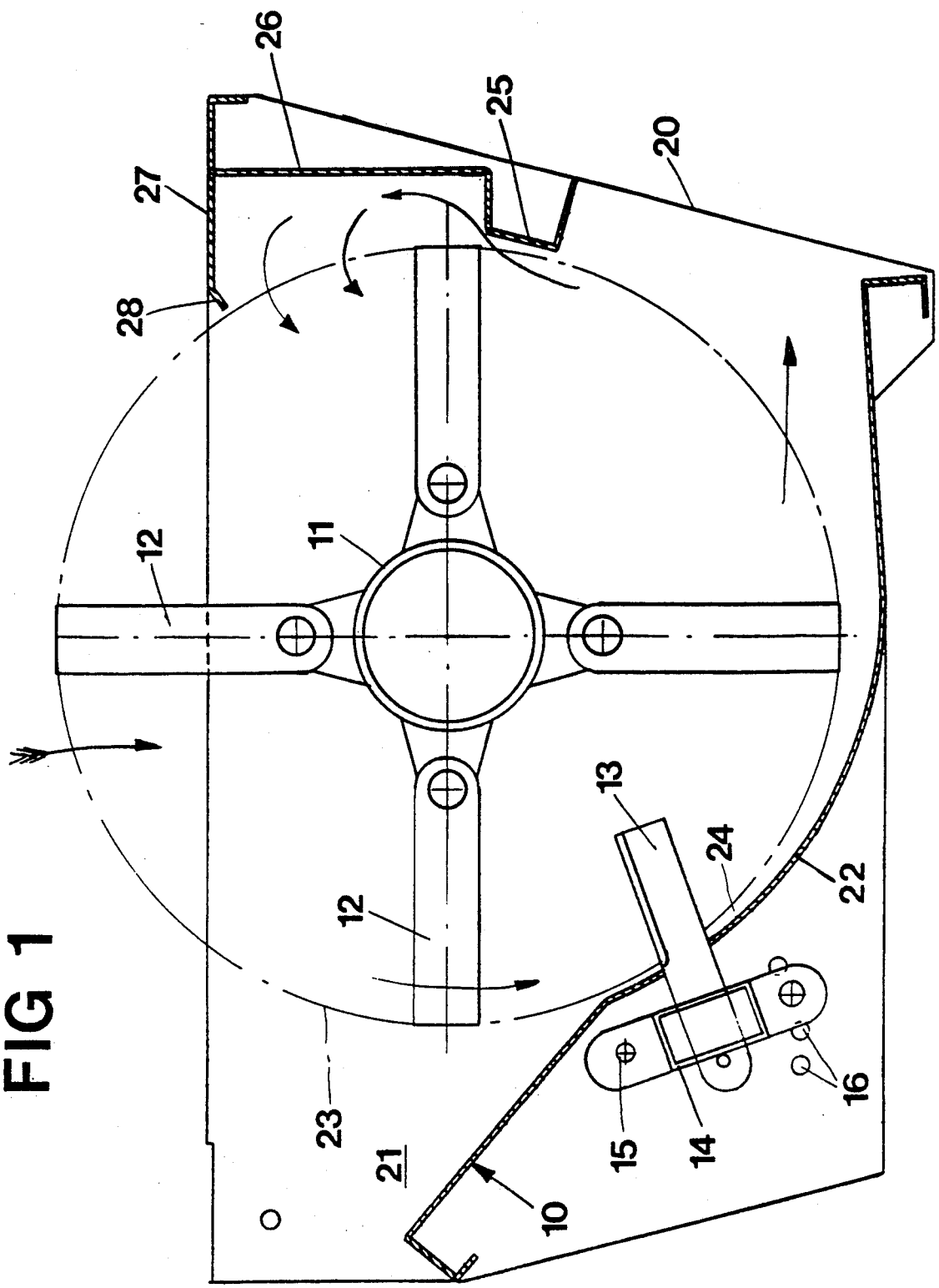
FIG. 1 is a cross section through the apparatus housing with a rotor supported therein.
Figure 2:
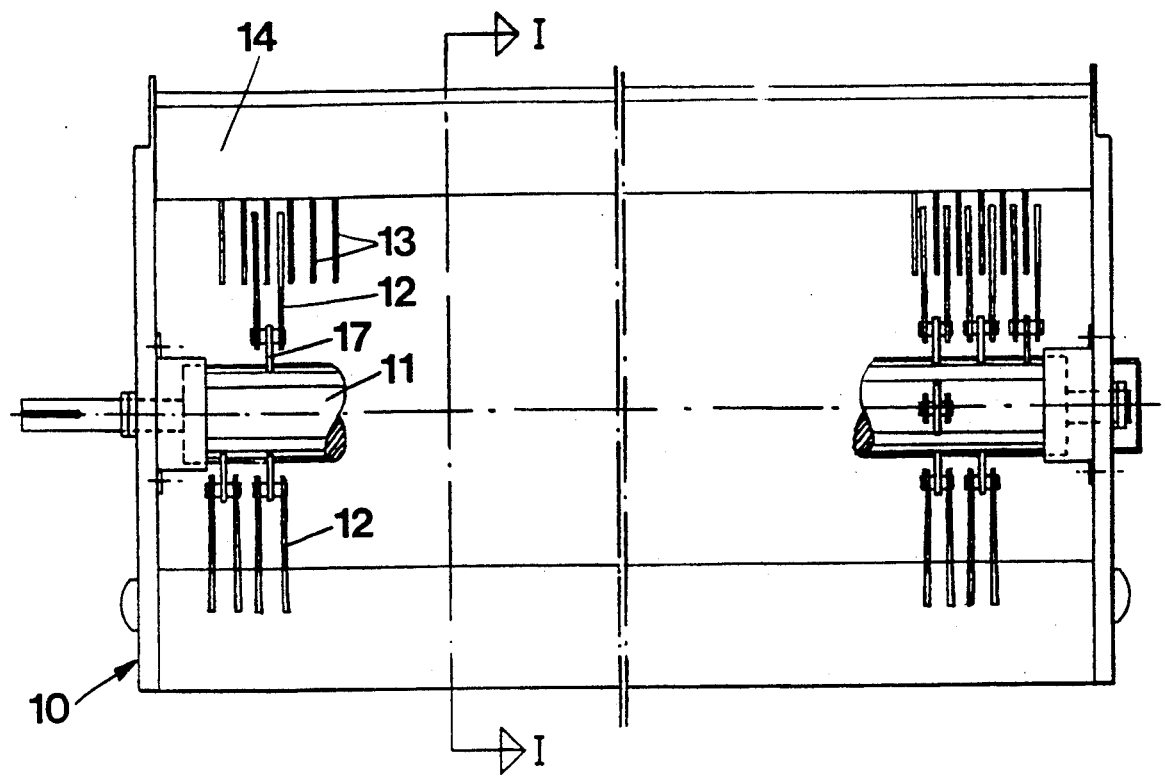
FIG. 2 is an axial section through the device of FIG. 1.

The straw cutter incorporates an apparatus housing 10, in the gabels of which is supported a knife rotor 11 equipped with radially projecting knife arms 12. At rotation of the rotor 11 the knife arms 12 pass between counter-knives 13, which are fitted in a knife beam 14. The knife beam 14 is pivotably connected to the apparatus housing 10 about the shaft 15 and it is arrestable in different positions 16, relative thereto, thus that the length of the part of the counter-knives 13 projecting between the knife arms 12 of the rotor 11 is variable, for allowing the straw cutter to be adjusted to different crops and fodders.

The knife arms 12 are not attached directly upon the rotor shaft 11 but via holders 17. The knife arms 12 are constituted by pivotably arranged beaters disposed in pairs about the same pivot shaft 18 at each holder. The beaters thus arranged in pairs are via the holders 17 attached in a zigzag pattern to the rotor 11.

Figure 3:
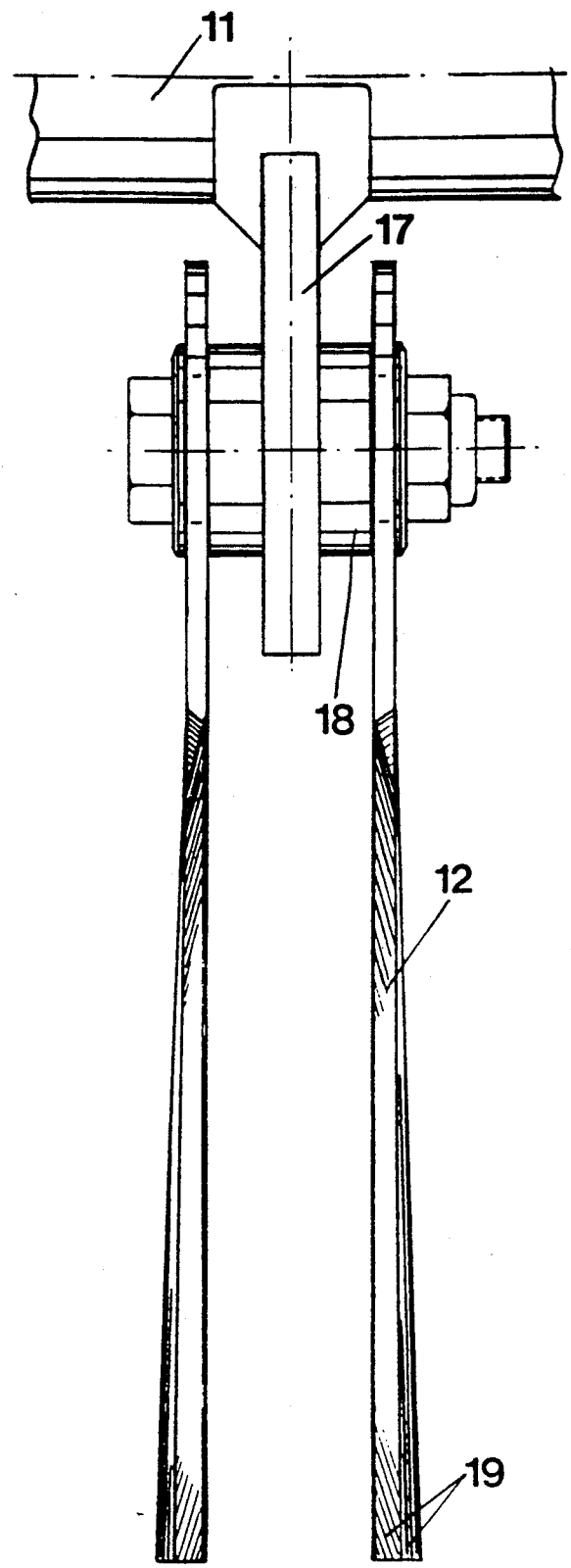
FIG. 3 shows in bigger scale a side view of a pair of knife arms attached to the rotor according to one embodiment.
Figure 4:
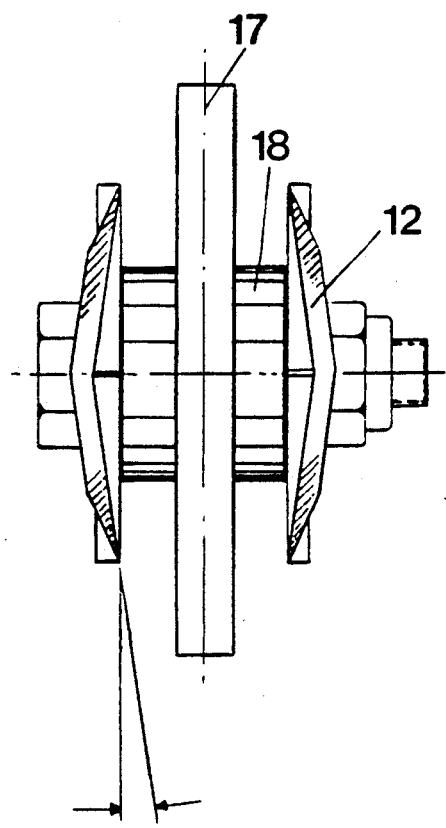
FIG. 4 shows a front view of the knife arms of FIG. 3.
Figure 5:
FIG. 5 shows a side view of a knife arm according to another embodiment.
Figure 6:
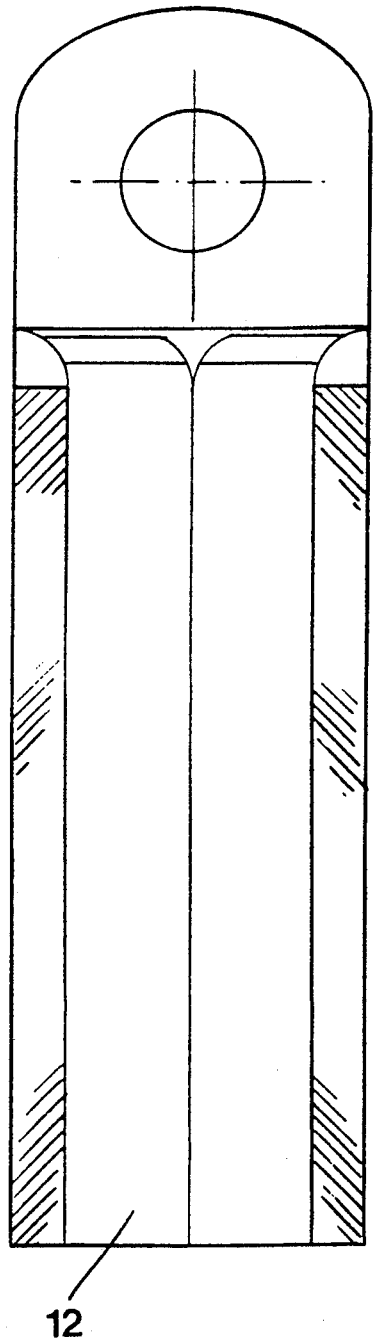
FIG. 6 shows a planar view of the knife arm according to FIG. 5.
Figure 7:
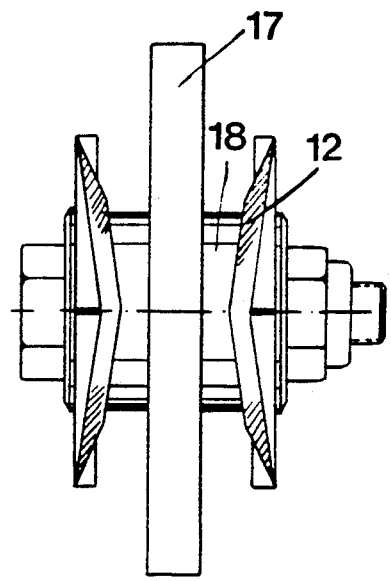
FIG. 7 and 8 are front views corresponding to FIG. 4 but showing other embodiments of knife arms.
Figure 8:
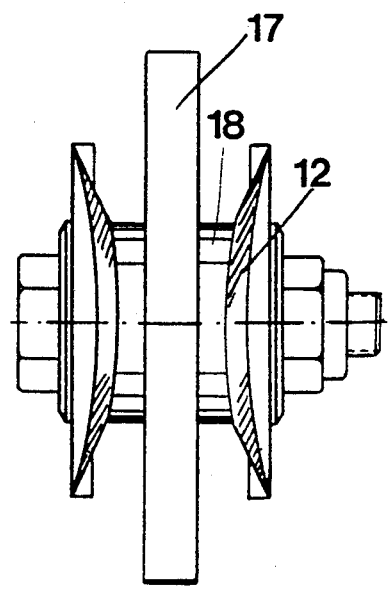

For increasing the blower effect of the rotor 11 and thereby increasing the distribution of the disintegrated straw the knife arms 12 are designed with a shovel-like shape in that they have been bent in a cross section across the knife arm to form a slight V-shape or alternatively an arched shape (FIG. 8) along the longitudinal direction. The V-shaped section according to the embodiment shown in FIG. 3 and 4 is successively reduced towards the mounting end of the knife arm 12, which has a planar, preferably rectangular cross section. The knife arms 12 thus arranged in pairs in this embodiment are positioned thus that the tips of the V are directed outwards away from each other. The angle between the shanks 19 of the V-shaped knife arm 12 at the outermost end of the knife arm preferably amounts to 150°–170°. According to the embodiment shown in FIG. 5 and 6 the v-shaped cross section is mainly constant and terminates adjacent the mounting end of the knife arm 12 in a planar cross section. The paired knife arms 12 according to FIGS. 7 and 8 are positioned with the tips of the V or the convex sides of the arch facing each other.

Figure 9:
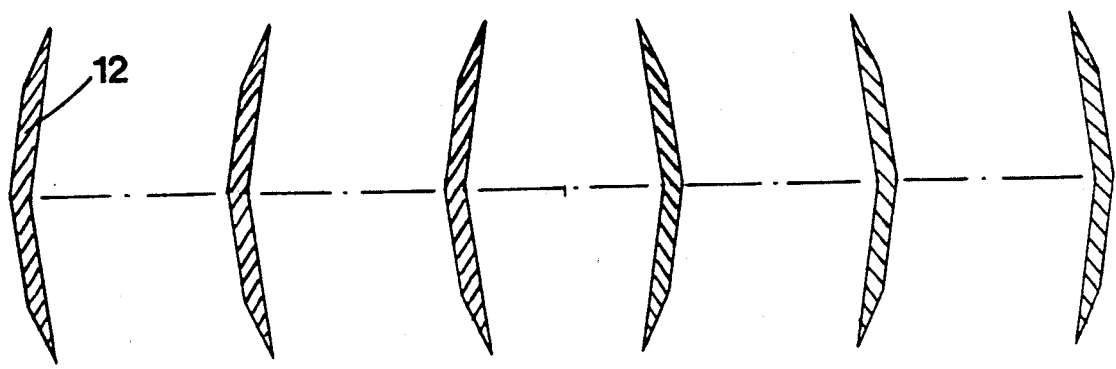
FIG. 9 and 10 schematically show cross sections through knife arms having different relative locations for obtaining a desired distribution effect.
Figure 10:
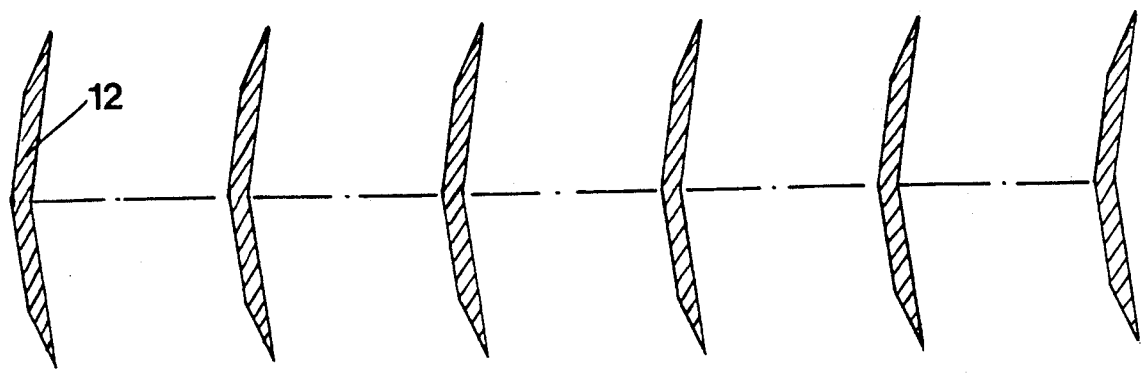

Other alternatives of the relative locations of the knife arms 12 are shown in FIGS. 9 and 10, whereby in FIG. 9 the knife arms 12 in groups, e.g. on one side of the intermediate portion of the rotor, are positioned with the tips of the V facing in one direction, in this case away from said intermediate portion, and which on the opposite side are directed in the opposite direction. In this manner is achieved an increased distribution angle. If it is desired to have a more gathered laying of the disintegrated straw it is possible to obtain this by turning around the knife arms 12, thus that tips of the V are directed towards the intermediate portion of the rotor 11. A flow of air directed towards the right-hand side or the left-hand side resp. can be obtained by positioning all knife arms 12 in the same direction, such as shown in FIG. 10.

The apparatus housing 10 in which the rotor 11 and the knife beam 14 are arranged has been given such a design, that the biggest possible portion of the air conveyed by the blower action of the rotor 11 is expelled through the outlet 20 of the apparatus housing, whereby shall be prevented that the air is brought back to the inlet 21 and there creates a counter-pressure. The bottom 22 of the apparatus housing 10 hereby is designed to form a slot 24 with the circumferential rotation path 23 of the knife arms 12, the width of which slot has its maximum in front of the knife beam and which increases towards the outlet opening 20 of the apparatus housing. The width of the slot in front of the counter-knives 13 is so small, that the circumferential rotation path 23 of the knife arms 12 is situated at a very small distance from the bottom 22 of the apparatus housing 10.

Above the outlet opening 20 the apparatus housing 10 is designed with a restriction 25 for minimizing the amount of air which is conveyed past the outlet opening 20. Above the restriction 25 in the apparatus housing 10 is provided a pocket 26, which at the upper side is bordered by a guiding plate 27, the end edge 28 of which extends in close vicinity of the circumferential rotation path 23 of the rotor 11. The amount of air, which by the rotor 10 has been conveyed past the outlet opening 20 thereby is urged inwards in a direction towards the center of the rotor and is prevented from reaching the inlet 21.

The invention of course is not limited to the embodiment shown but can be modified within the scope of the claims.

I claim:

1. A cutter, comprising:
    an apparaus housing;
    a rotatable rotor disposed in the housing, and having a rotation axis;
    a plurality of counterknvives in the housing and disposed in at least one row parallel to the rotation axis;
    a plurality of knife arms arranged around the rotor at spaced apart locations and rotatable along with the rotor, the knife arms and the rotor being so placed, sized and shaped that the knife arms pass between the counterknives in the row thereof when the rotor is rotated, the knife arms having a longitudinal direction and being bent in a cross section across the knife arms from a longitudinal centerline thereof and tapered along the longitudinal direction.

2. A cutter as claimed in claim 1, wherein each knife arm has a mounting and connected to the rotor and an outer end away from the rotor; the bend in the cross section of each knife arm gradually reducing in the longitudinal direction from the outer end toward the mounting end.

3. A cutter as claimed in claim 1, wherein each mounting end of a knife arm has a rectangular cross-section across the knife arm.

4. A cutter as claimed in claim 1, wherein the bent cross section across each knife arm extends essentially continuously over a substantial portion of the length of each knife arm.

5. A cutter as claimed in claim 1, wherein the knife arms are in the form of beaters.

6. A cutter as claimed in claim 1, wherein each knife arm has a longitudinal axis and its bent cross section is perpendicular to the axis, the cross-section including a convex side and an opposite concave side.

7. A cutter as claimed in claim 1, wherein the cutter is a straw cutter.

8. A straw cutter as claimed in claim 1, wherein each knife arm is bent in cross section to form a generally V-shaped cross section.

9. A cutter as claimed in claim 8, wherein each knife arm, which is bent in a V-shaped cross-section across the knife arm, has shanks which form angles of between 150° and 170° in the V-shape.

10. A cutter as claimed in claim 8, wherein each knife arm has a tip at the outside of the V of the V-shaped cross section; the knife arms being arranged in pairs such that there is a respective pair of the knife arms attached at each location on the rotor, and the tip of each knife arm of a pair faces toward the tip of the other knife arm of the respective pair.

11. A cutter as claimed in claim 8, wherein each knife arm has a tip at the outside of the V of the V-shaped cross section; the knife arms being arranged in pairs such that there is a respective pair of the knife arms attached at each location on the rotor, and the tip of each knife arm of a pair faces away from the tip of the other knife arm of the respective pair.

12. A cutter as claimed in claim 2, wherein each knife arm has a tip at the outside of the V of the V-shaped cross section, each tip of the knife arms faces in the same direction, whereby a flow of air is guided in a common direction.

13. A straw cutter as claimed in claim 1, wherein each knife arm is bent in cross section to form an arch-shaped cross section.

14. A cutter as claimed in claim 13, wherein each knife arm has a convex side at the outside of the arch shaped cross section; the knife arms being arranged in pairs such that there is a respective pair of the knife arms attached at each location on the rotor, and the convex side of one knife arm of a pair faces toward the convex side of the other knife arm of the respective pair.

15. A cutter as claimed in claim 13, wherein each knife arm has a convex side at the outside of the arch shaped cross section; the knife arms being arranged in pairs such that there is a respective pair of the knife arms attached at each location on the rotor, and the convex side of one knife arm of a pair faces away from the convex side of the other knife arm of the respective pair.

16. A cutter as claimed in claim 13, wherein each knife arm has a convex side at the outside of the arch shaped cross section; the knife arms being arranged in pairs such that there is a respective pair of the knife arms attached at each location on the rotor, and the convex side of each of the knife arms facing in the same direction, whereby a flow of air is guided in a common direction.

* * * * *